(12) United States Patent
Menon

(10) Patent No.: US 7,685,056 B2
(45) Date of Patent: Mar. 23, 2010

(54) SYSTEM AND METHODS FOR CONTINUOUSLY OFFERED GUARANTEED MUTUAL FUND WITH FULL AND PERMANENT ALLOCATION TO RISKY MARKETS INVESTMENTS

(75) Inventor: Ramesh K. Menon, Woodstock, NY (US)

(73) Assignee: Structured Investment Management, Inc., New York, NY (US)

(*) Notice: Subject to any disclaimer, the term of this patent is extended or adjusted under 35 U.S.C. 154(b) by 6 days.

(21) Appl. No.: 11/759,665

(22) Filed: Jun. 7, 2007

(65) Prior Publication Data
US 2007/0288400 A1 Dec. 13, 2007

Related U.S. Application Data

(60) Provisional application No. 60/804,269, filed on Jun. 8, 2006.

(51) Int. Cl.
*G06Q 40/00* (2006.01)

(52) U.S. Cl. .......................................... 705/37; 705/35

(58) Field of Classification Search ............... 705/36 R, 705/37
See application file for complete search history.

(56) References Cited

U.S. PATENT DOCUMENTS

| 6,598,028 | B1 | 7/2003 | Sullivan et al. |
| 7,398,243 | B1* | 7/2008 | Ocampo .................... 705/36 R |
| 2005/0044035 | A1 | 2/2005 | Scott |

OTHER PUBLICATIONS http://web.archive.org/web/20000309192459/http://www.finpipe.com/equity/preftyp.htm "Types of Preferred Shares" Mar. 9, 2000.*
International Search Report and Written Opinion of the International Searching Authority for PCT/US07/70677 issued Aug. 29, 2008 (7 sheets).

* cited by examiner

*Primary Examiner*—James A Kramer
*Assistant Examiner*—James A Vezeris
(74) *Attorney, Agent, or Firm*—Leason Ellis LLP

(57) ABSTRACT

Software implemented guarantee valuation engine and methodology that enable a mutual fund that is continuously offered; always fully invested in traditional assets that correlate to a benchmark and which is subject to a guarantee with respect to net asset value on a specified future date to be re-priced on a daily basis and to have the effect of such re-pricing in the reported NAV of the fund.

14 Claims, 6 Drawing Sheets

SYSTEM AND METHODS FOR CONTINUOUSLY OFFERED GUARANTEED MUTUAL FUND WITH FULL AND PERMANENT ALLOCATION TO RISKY MARKETS INVESTMENTS

This patent application claims the benefit of priority under 35 U.S.C. §119(e) of U.S. application Ser. No. 60/804,269, filed Jun. 8, 2006, entitled "Continuously Offered Guaranteed Mutual Fund With Full And Permanent Allocation To Risky Market Investments," which is hereby incorporated by reference in its entirety.

FIELD OF THE INVENTION

The invention described herein relates to interday pricing of principal protected mutual funds and, more particularly, to a system and method for pricing components that provide principal-protection and including such pricing in the daily share price of the fund.

BACKGROUND OF THE INVENTION

SEC-registered guaranteed mutual funds, sometimes known as principal protected mutual funds, have existed since at least 2002. These funds suffer from several drawbacks including that they are only available for purchase by investors during an initial offering period (after which the fund is closed to new investors) and that they employ a dynamic hedging strategy known as Constant Proportion Portfolio Insurance ("CPPI") which can result in a low or zero allocation to the desired risky market (with a correspondingly high allocation to less risky fixed-income instruments).

SEC-registered principal-protected closed-end funds have also been in existence for some time. These fluids suffer from the same drawbacks as well, including that they offer uncertain liquidity because investors have no contractual redemption rights unlike in an open-ended mutual fund, and, apart from the time of the initial offering, investors may not be able to purchase (or later, sell) shares at a price that corresponds to the net asset value of the fund.

Known guaranteed mutual funds are the beneficiary of a financial guarantee from a highly-rated financial institution. These guarantees are provided in exchange for a fee that is determined in advance. Such guarantees do not suit funds whose investment strategies might cause the cost of the guarantee to change significantly. These funds are thereby limited to pursuing CPPI-based strategies (of the type described above). Since even CPPI-based strategies are subject to small changes in the cost of the related guarantee, guaranteed funds are not made available for sale to new investors after the initial offering period although redemptions are permitted.

Therefore what is needed is a guaranteed mutual fund that can be continuously offered to investors and remain fully invested in risky securities or strategies, while offering investors an assurance of a minimum return on their invested principal.

SUMMARY OF THE INVENTION

In accordance with one aspect of the invention described herein, a valuation engine is constructed to guarantee, on a daily basis, a minimum investment return that is to be provided by a fund on a specified maturity date. The fund is of the open ended type having traditional assets that correlate to a particular benchmark. The engine comprises a computer having a processor and software code executing in the processor. The code is configured to quantify an aggregate net asset value of the assets of the fund ("ANAV") as of a current date, calibrate a swap agreement relative to any change in the benchmark on the current date, calibrate an option agreement in regard to the ANAV on the current date, price a share of the fund at the close of the current date and publish the price.

The valuation engine utilizes the swap agreement as a hedge against declines in the benchmark and utilizes the option agreement as a hedge against any decline in the value of the fund below the guaranteed minimum return on the maturity date. The price can be computed by adding the calibrations to the ANAV and dividing the total by a number of outstanding fund shares on the current date (e.g., a date of such computation).

In another aspect of the invention, a valuation engine can be constructed to guarantee, on a daily basis, a minimum investment return that is to be provided by a mutual fund on a maturity date, as above, but can have code that is instead configured to quantify an ANAV of the assets of the fund as of a current date, re-price at least one guarantee contract in view of changes in the ANAV relative to the ANAV on a prior date, price the fund at the close of the current date by adding each re-priced guarantee contract to the ANAV, and publish the price for use on the current date.

In still another aspect of the invention, a computer-implemented method is provided that can guarantee a minimum return on a maturity date for an investment in an open-ended fund of the type having an investment strategy that tracks an objective benchmark. The method operates on a programmed computer by responding to a data feed which includes a state of the market on a daily basis with adjusts to the magnitude of a hedge provided by a swap agreement and an option agreement, respectively, relative to a state of the market on a prior day, re-pricing the swap agreement and the option agreement based on the adjustments to the magnitude of the hedges, pricing a class of shares in the fund by computing a net asset value ("NAV") using the data in the state of the market data feed and adding to the NAV the re-priced swap and option agreements, and communicating the result of the pricing step to a machine connected to the network as a single price offering for the class of shares.

These and other aspects, features and advantages shall be apparent from a review of the accompanying drawing figures and the corresponding discussion of certain embodiments of the invention.

BRIEF DESCRIPTION OF THE DRAWING FIGURES

DETAILED DESCRIPTION OF CERTAIN EMBODIMENTS OF THE INVENTION

Figure 1:
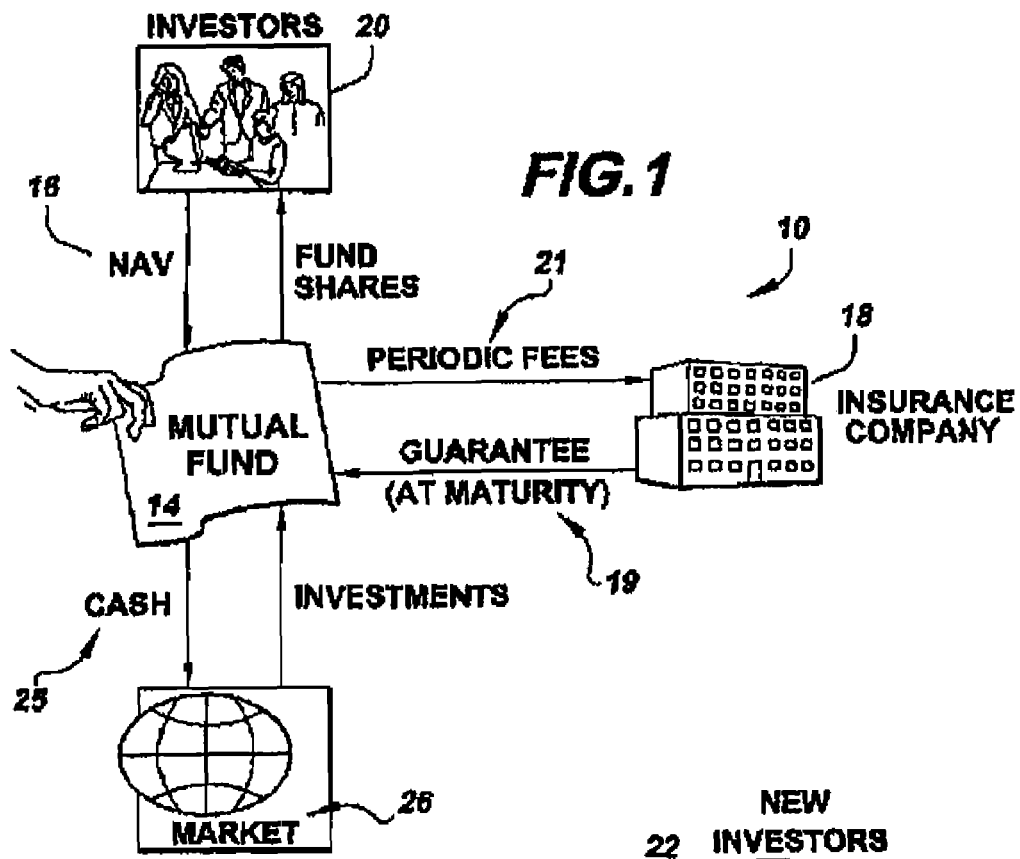
FIG. 1 is a concept diagram of the initial mechanics of a guaranteed mutual fund with full allocation to risky market investment.

By way of overview and introduction, the present invention provides a guarantee valuation engine which can be configured to calibrate a minimum return guarantee against the aggregate net asset value of the traditional assets of a fund (that is to say, the ANAV) in view of any changes in the daily market. The engine operates to calibrate swaps and puts relative to a benchmark while the fund can remain fully invested in support of its investment strategy. In this way, the guarantee valuation engine permits investors to subscribe and redeem their respective positions at any time during the guarantee period, while having the benefit of the minimum return guarantee. This is accomplished by structuring the financial guarantee held by the fund such that it is subject to daily re-pricing in view of the ANAV. The re-pricing is reflected in the price of a share in the fund, the net asset value (NAV)/share, by the inclusion of an amount that takes into account any changes in cost of the guarantee, since the commencement of the fund when the guarantee and its terms had first been established. This enables the provider of the financial guarantee to provide a guarantee under existing terms, thereby allowing the fund to remain open to new investors.

The ability to arrive at a price for the present value of a guarantee that is only contingently payable on a future maturity date has been enigmatic. The guarantee itself is a component that might have to be relied upon to augment the value of the fund at the maturity date in order to satisfy the terms of the guarantee (e.g., 150% return on principal invested on the maturity date). However, the future value of the fund at the maturity date is not known, and so the guarantee component is unknown. If the present value of the guarantee is unknown, it cannot be computed to include in the NAV of the fund. As a consequence, correct fund pricing is available at the initial offering to a defined set of inventors, but has not been available thereafter.

However, the guarantee valuation engine of the present invention provides a new tool for active, open-ended fund management by actively re-pricing contracts to which a value can be ascribed as a surrogate to define the value of the guarantee on each date between fund commencement and any redemption of the guarantee obligation. The traditional assets included in the fund have an ANAV that is the sum of the market value of each such asset on that date. The guarantee is to protect the principal invested to hold these traditional assets. The value of the guarantee on any given date is, in part, a function of the aggregate value of the traditional assets of the fund. If the fund grows through further subscriptions, for example, then the guarantee valuation engine operates to purchase additional swap agreement rights. On the other hand, if subscribers redeem shares, the guarantee amount is reduced and the guarantee valuation engine operates to liquidate a portion of swap agreement rights now being held. Also, the value of the guarantee on any given date is a function of how much time remains until the guarantee comes due, namely, the maturity date. In an efficient market, the price of swap agreements and puts against the fund's investments reflects both of these factors.

The swap agreement referred to herein is a financial contract that provides for the periodic payment of agreed amounts to a counterparty versus receipt of an index-based payment to the swap holder upon termination of the swap agreement. The put agreement referred to herein is a financial contract that provides for the initial payment of an agreed premium versus receipt of an amount based on the NAV of the fund at expiration.

Figure 2:
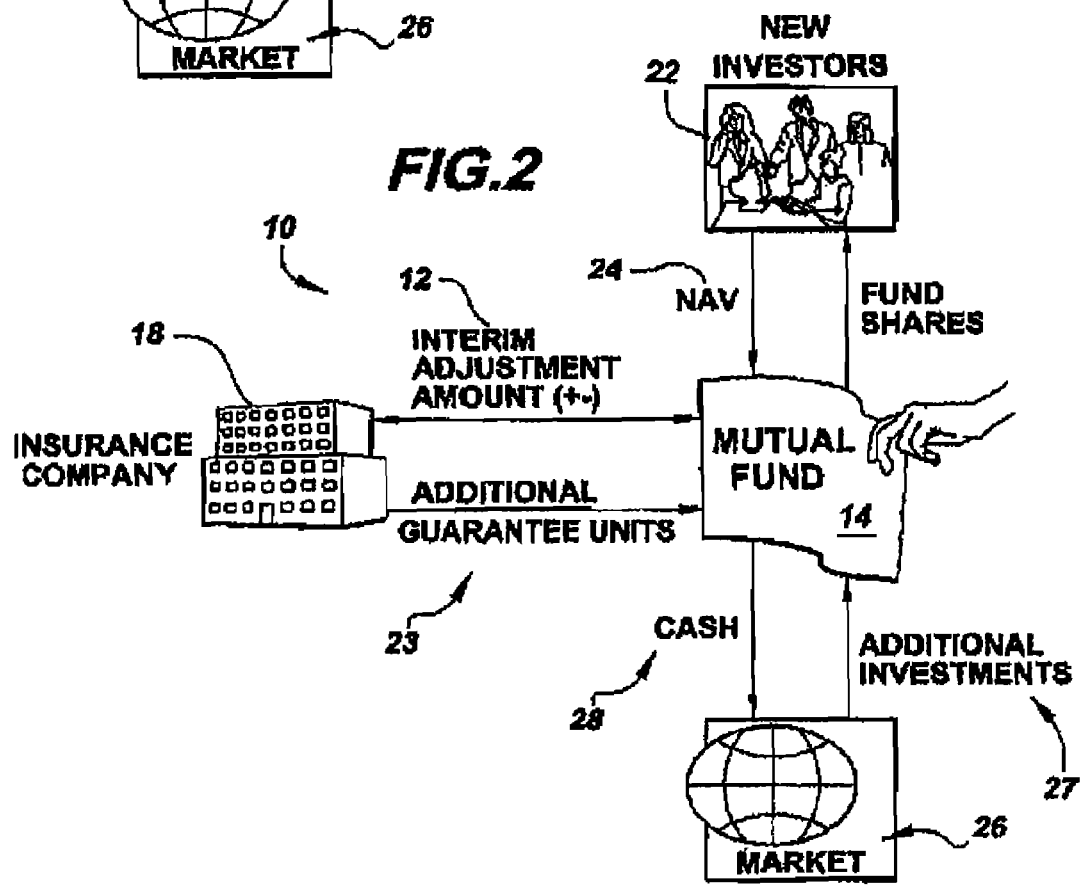
FIG. 2 is a concept diagram of the mechanics with respect to subsequent investment in the fund.

Referring now to FIGS. 1 and 2, concept diagrams illustrate the role and operation of a guaranteed mutual fund with full allocation to risky market investments (the "fund") 14. In FIG. 1, the fund 14 sells shares to investors 20 at prevailing NAV 16. The fund enters into a guarantee contract 19 with an insurance company 18 or other provider versus periodic receipt of fixed fees 21. The fund invests substantially all its assets 25 in the underlying market 26. In FIG. 2, the guarantee provider 18 re-prices the guarantee 19 on a daily basis and computes an interim adjustment amount 14 that reflects the change in price of the guarantee since inception. (The adjustment amount 14 may also be characterized as a surrender charge or surrender value for the financial guarantee if the guarantee is structured as an insurance policy.) This amount is included in the calculation of the net asset value of the fund. The guarantee provider 18 increases the guarantee by the necessary additional amount 23 and the fund 14 accommodates new investors 22 at an NAV 24 that reflect the current price of the guarantee. The fund makes additional investments 27 in the market 26 using the additional cash 28 generated from the new investors 22.

Figure 3:
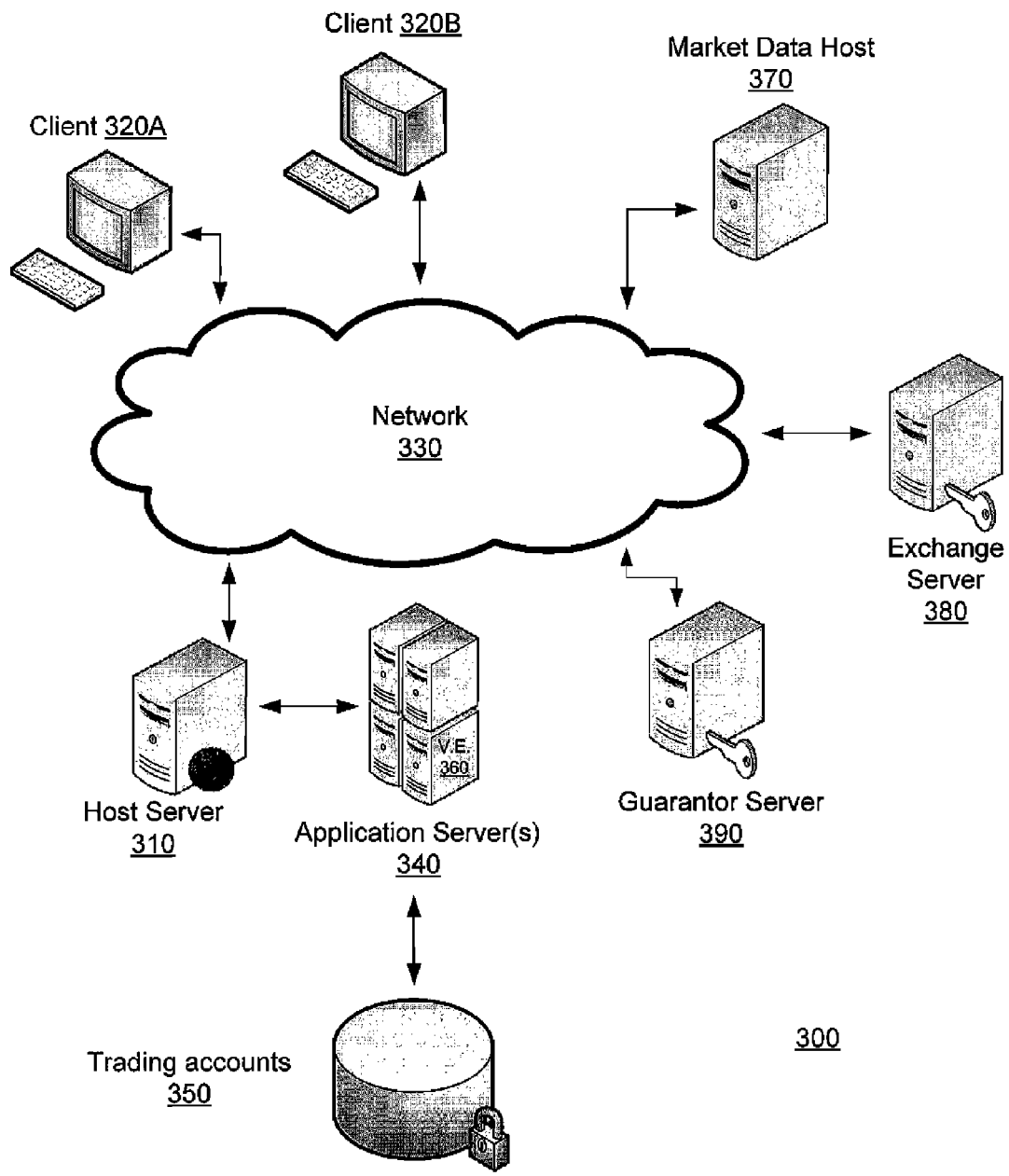
FIG. 3 is a network diagram illustrating an arrangement of hardware suitable for implementing an embodiment of the invention.

FIG. 3 is a network diagram illustrating one arrangement of hardware that is suitable for implementing an embodiment of the invention. The fund is operated through the auspices of a host server 310, such as a web server that provides connectivity to distributed client machines 320 across a network 330. The client machines are used by investors which can include individuals, trustees, broker-dealers, institutions, and the like. Communications over the network can assume any of a variety of conventional formats and form no part of the present invention. As a non-limiting example, communications can be by secure connections over TCP/IP. The client machines can operate on a variety of platforms, such as one of the variants of the Windows® brand operating system from Microsoft Corporation of Redmond, Wash., or Apple Computer of Cupertino, Calif., or some other operating system. The network can comprise computer networks, telephone networks, satellite networks of combinations of these and other network types so long as communications can be conveyed among the various clients and servers.

The host server 310 is preferably communicatively connected to further servers behind a firewall, such as application server(s) 340. At least one application server executes the valuation engine code 360. The same application server 340 or another one provides account management functionality including the role of gatekeeper for funds that are to be credited to or debited from associated accounts maintained by banks or other institutions (including possibly one of the clients 320). Account records are maintained in a secure database 350 that identifies investors, their respective share holdings, any unapplied cash balance to be used to augment or establish a subscription in the fund, any settlement amounts due as a result of a redemption, and other data as is customary in the field.

The guarantee valuation engine ("GVE") code 360 utilizes market data retrieved from standard sources such as Bloomberg and Reuters. The information can be retrieved electronically over the network 330 from various data hosts, which are collectively illustrated in FIG. 3 as market data host 370. The fund can issue instructions from the application server 340 and over the network so as to execute trades that cause new or existing investors to subscribe or redeem shares in the fund. Such changes are implemented using a conventional exchange server such as server 380. One or more investors can also provide broker-dealer services to the fund, and in that situation the exchange server 380 can be associated with a particular investor. Trades can be initiated in view of instructions from client machines 320 that are processed by the host or application servers. Trades also can be initiated in response to a trading strategy or algorithm that the fund is executing on one of its servers 310, 340.

The guaranteed minimum return is provided by a guarantor which in some implementations of the invention can be a third party (neither the fund nor an investor) and in other implementations can be the fund itself. The guarantor can have a server 390, as illustrated, communicatively connected to the network 330 which collects and pays premiums, as appropriate, in accordance with the terms of the guarantee contracts, movements in the market, and diminishing time until the maturity date. The guarantee contracts can comprise an insurance policy, swap agreement, put agreement, or a combination thereof. The structure of the guarantee contract is such that the value of the guarantee contract floats with changes in a benchmark against which the fund is measured and the size of the fund. Periodic payments are made to satisfy both parties to the contract that a guaranteed minimum return is ensured during the course of the guarantee period for a rational market price, determined daily, and adjusted at least periodically and more preferably daily. Preferably, the guarantee contract is arranged such that it provides evidence of the guarantor's ability to provide credit to fulfill its financial obligations under the guarantee contract.

Figure 4:
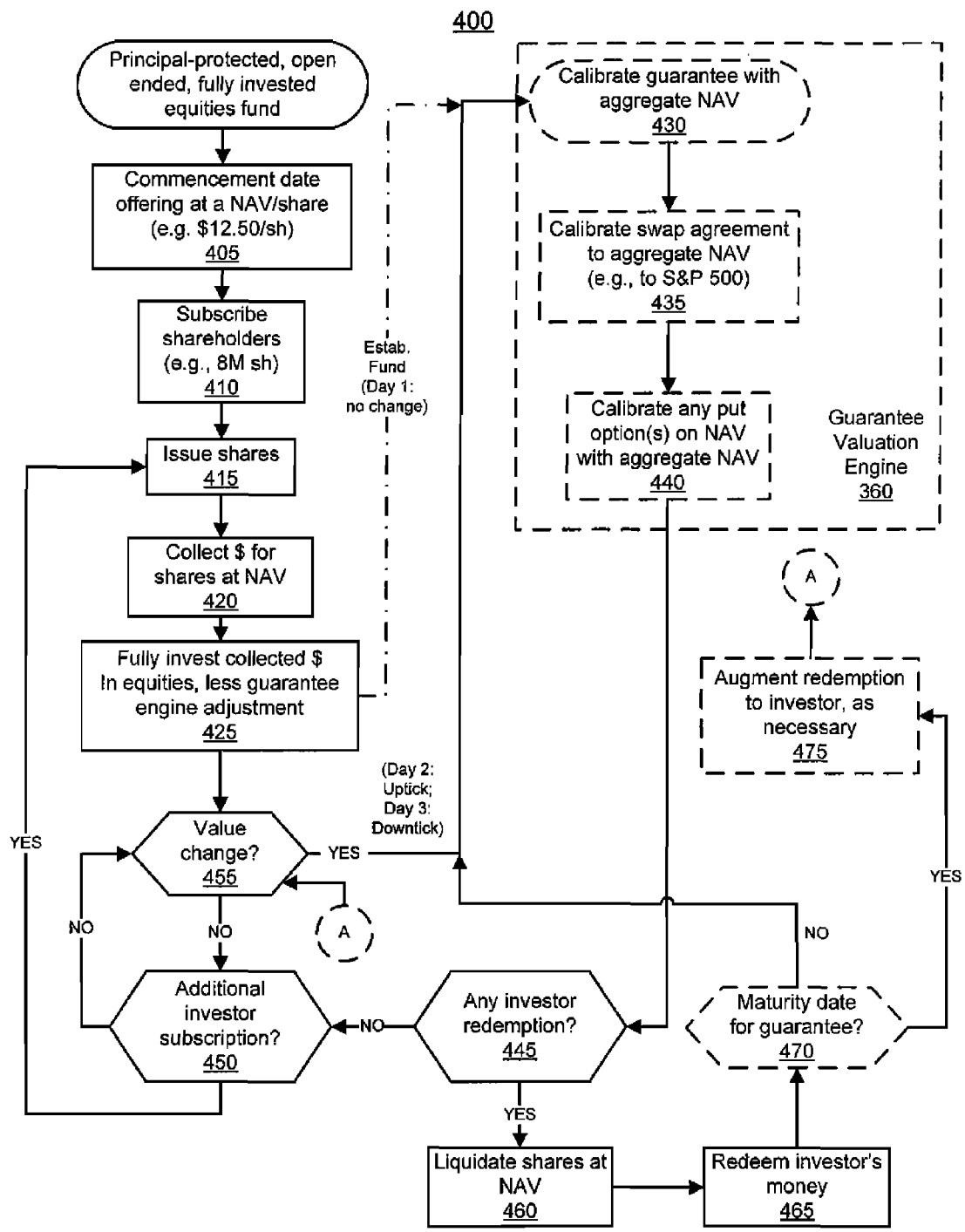
FIG. 4 is a flow diagram illustrating active management of a continuously-offered mutual find using a guarantee-valuation engine in accordance with general principles of the invention.

Referring now to FIGS. 1 and 4, the GVE code 360 is illustrated in connection with a flow diagram that illustrates active management of a continuously-offered mutual fund in accordance with one exemplary embodiment of the invention. Process 400 shows the steps that can be taken by a fund 14 in managing a principal-protected, open-ended, fully-invested equities fund using the GVE code. The fund 14 is offered by way of a prospectus to investors 20 and identifies the investment strategy and attendant risks, in a conventional manner, as well as a guaranteed minimum return on a maturity date that is available to all investors as part of the fund offering. Subscribing investors respond to the offering to purchase shares in a conventional maimer, and depending on the response to the subscription offering, the fund commences on a commencement date at a particular NAV/share, say $12.50/share, as indicated at block 405.

Investors are subscribed as of the offering date for all of the shares accepted on the commencement date, as indicated at block 410. If, for example, 8 million shares are issued, then the NAV of the fund on the commencement date is $100,000,000.00. The shares are issued to investors, as indicated at block 415, by the fund manager, either directly or through surrogates such as any underwriter(s) or market maker(s). Money is collected 16 for the shares subscribed to by each investor at the NAV on the commencement date, as indicated at block 420. The fund 14 then implements its strategies using the cash 25 received from the investors to make investments and satisfy its investing and trading strategies. In particular, as indicated at block 425, the fund invests the cash 25 in equities in fulfillment of its investment strategy, less fees. Typically, the investment strategy is with regard to a benchmark so that fund performance can be objectively gauged. In one embodiment, the fund invests its cash so as to track movement of the benchmark "the Standard & Poors 500 Index" by holding the same stocks as the index in the same general proportions. Such a fund can be managed passively, though is still expected to have a portfolio turnover rate that correlates with that of its underlying benchmark.

As an illustration, on Day 3, an investor decides to purchase additional units and the swap agreement has a non zero value. Let's assume that the value of the traditional assets per share is now $11 and the swap agreement is worth $1. The NAV per share is now $12. If an investor subscribes to a single share at this time, $11 will be invested in traditional assets and $1 will be paid to the swap counterparty for an incremental swap unit. This $1 will be immediately returned to the fund in the daily settlement amount relating to the additional swap unit purchased and will be held in cash by the fund (or reduce earlier borrowings). Next, assume that the value of the traditional assets per share is $12 and the swap agreement is worth –$1. The NAV per share is now $11. If an investor subscribes to a single share at this time, $12 will be invested in traditional assets and $1 will be paid by the swap counterparty for an incremental swap unit. This $1 will be immediately returned to the swap counterparty in the daily settlement amount relating to the additional swap unit purchased and the fund will borrow the incremental $1 required to completely fund its purchase of traditional assets.

As another illustration, again consider the value of the traditional assets per share as being $11 and the swap agreement being worth $1. The NAV per share is again $12, but if an investor redeems a single share at this time, $11 will be liquidated in traditional assets and $1 will be paid by the swap counterparty for the reduction in swap units. This $1 will be immediately returned to the counterparty in the daily settlement amount relating to the swap unit liquidated and $1 will be borrowed by the fund in order to fully pay the investor at the published NAV on the current date. Similarly, when the value of the traditional assets per share is $12 and the swap agreement is worth negative $1, the NAV per share is $11 and an investor redeeming a single share at this point in time will cause $12 to be liquidated in traditional assets, with $1 being paid to the swap counterparty in view of the reduction in swap units. This $1 will be immediately returned to the fund in the daily settlement amount relating to the swap unit liquidated and the fund will hold $1 in cash.

Unlike other funds, the GVE code 360 operates to protect the fully-invested principal of the fund 14 by calibrating the notional amount covered by the guarantee contracts to coordinate with the ANAV in the fund on any given date. In this way, a minimum return on a specified maturity date can be guaranteed. Thus, in one embodiment, investors can be guaranteed a return no less than 150% of their initial investment, before management fees, on the maturity date.

At block 430, the GVE 360 operates to calibrate the guarantee contract. On the commencement date of the fund, calibration comprises an initial payment of a premium so as to establish a price on the commencement date. Thereafter, calibration of the guarantee comprises using the GVE 360 to index the swap (block 435) and puts (block 440) in accordance with a calculation model, as described further below. The result of calibration is that the fund has paid an incremental premium or has collected a return on previously paid premiums in response to changes in the ANAV, such that the guarantee contract is scaled to the present ANAV and such that premiums to guarantee the specified minimum return on the maturity date are rationally related to the present state of the market.

Thus, the offering on the commencement date of the fund 14 (day "1") establishes a principal-protected fund. As a departure from other principal-protected funds, however, the fund 14 is fully invested in equities thereby enabling it to faithfully execute an investment strategy such as tracking a benchmark index. Moreover, as days, weeks, months and years go by toward the maturity date of the guarantee, investors 20 can divest or augment their positions and new investors 22 can join the fund 14 while having the protection of a guarantee scaled to the adjusted notional amount of the fund, that is, scaled to the number of shares presently outstanding times the NAV/share on the offering date.

Generally, at blocks 445-475, the management of the fund 14 proceeds on subsequent days, with daily calibration by the GVE code 360, to account for any redemptions, further subscriptions, or changes in the value of the fund due to market fluctuations.

More specifically and with reference now to FIGS. 2 and 4, at block 445 the software executing on the application server determines whether there have been any redemption requests by the fund's investors. As noted above, redemption requests can be communicated to the fund's servers through a network, such as the Internet, but also can be communicated by telephone or other messaging medium now existing or later developed. A redemption request identifies the trading account desiring to redeem shares and the number of shares and any terms on the transaction such as a limit price, and preferably identifies the shareholder's name, the name of the fund 14, the account number, the share or dollar amount to be redeemed, and can further include the signature of all shareholders on an account.

A redemption request can be processed by a computer or the server running the GVE code 360 or in communication with such machine by identifying an investor account associated with the redemption request and disassociating an integer number of shares from the investor account that substantially corresponds to the redemption request in terms of number of shares or dollar amount to redeem. The computer issues instructions that cause a money transfer request to credit the investor's account, such as in an amount equal to the product of the integer number of shares and the price, less any management fee. The software updates its records to note any premiums received from calibration of outstanding guarantee contracts.

In the event that there have been no redemption requests submitted, the software next checks whether there have been any subscription requests submitted by existing or new investors 22, at block 450. Subscription requests can be communicated in the same manner as a redemption request, and identify the trading account and the amount to invest. If there have been subscription requests, then the software handles that event generally as described above in connection with blocks 415 through 425, by issuing shares in exchange for the moneys paid-in to cover the present per share NAV 24 and by investing the cash 28 received from the new investors 22 to make additional investments 27 consistent with the trading strategy of the fund. The GVE code 360 calibrates the guarantee to maintain synchronization of the guarantee contract with the notional amount of the fund (the aggregate net asset value of the total of all investments now held by the fund on that trading day, including the additional share subscriptions).

Thus, a subscription request by the investor is processed by first identifying an investor account associated with the subscription request (e.g., in the data base 350) which has cash for investment in the fund. Then, an integer number of shares is associated with the investor account as a function of the NAV on that date. The integer number of shares is always less than the amount of cash paid in divided by the NAV/share price since there are guarantee costs and typically management fees as well. A fund transfer request is initiated to transfer cash from the subscribing investor in order to to pay for shares and to calibrate the guarantee contract(s).

If there are no further subscription requests, then a test is made at block 455 to determine whether there has been a value change. A value change—which is typical from trading day to trading day—is processed by the GVE code by accessing market data provided by server(s) 370 and performing calibrations to set the guarantee in synchronization with aggregate net asset value of the investments held by the fund in view of the respective closing prices of the holdings on that trading day.

Referring again to block 445, from time to time an investor can redeem a portion or all if his or her investment in the fund at the NAV calculated for the date on which the redemption is to be made. Thus, if a redemption request is provided to the fund's servers, a specified number of shares is liquidated at NAV, as indicated at block 460. The investor's trading account is credited with the money realized from the redemption, and debited the number of shares previously held. Most redemption events will occur on an arbitrary date which may not coincide with the maturity date of the guarantee. In the event that the redemption is not on the maturity date of the guarantee, then the GVE code 360 calibrates the guarantee to maintain synchronization of the guarantee contract with the aggregate net asset value of the total of all investments now held by the find on that trading day, after reducing the number of shares outstanding as a result of the redemptions made that day.

In the event that the redemption occurs on the maturity date of the guarantee, the investor will receive no less than a specified minimum return on the initial NAV/share, in accordance with the prospectus offering (e.g., as in the example above, 150% of the initial NAV/share). If the performance of the fund or possibly its benchmark have not increased over the guarantee period so as to at least meet the minimum return, then a call is made against the guarantee contract counterparty to augment the investor's return in accordance with the contract, as indicated at block 475. On the other hand, if the fund has outperformed the minimum guarantee, then the guarantee contract, in effect, expires worthless because no investor will seek payment on the guarantee.

After the maturity date, the process flow loops through the blocks described above, except for those blocks indicated in dashed lines (namely, blocks 430-440, 470, and 475).

Figure 5:
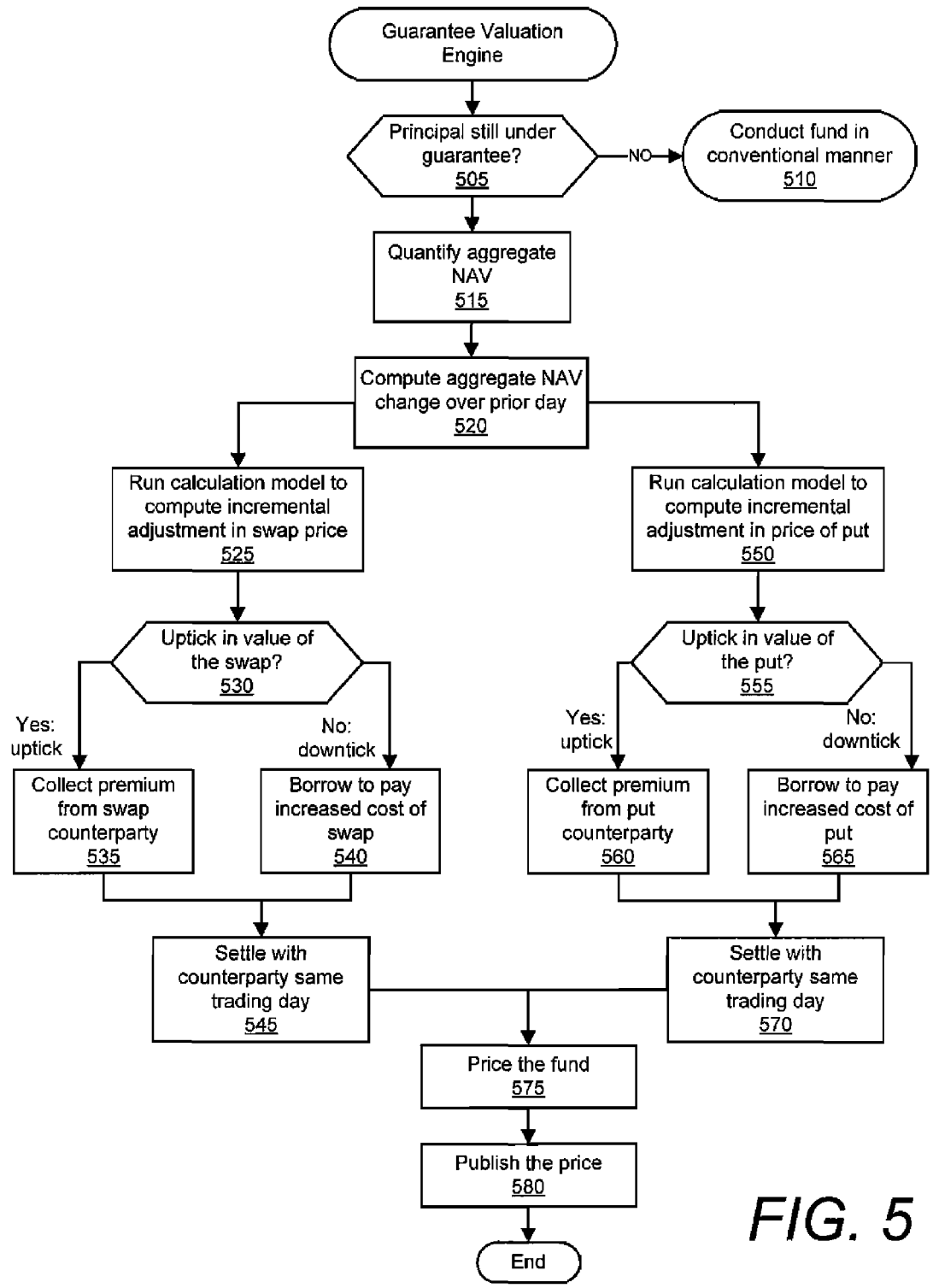
FIG. 5 is a flow diagram illustrating further details of the operation of a guarantee-valuation engine operating upon a continuously offered mutual fund in accordance with an embodiment of the invention.

With reference now to FIG. 5, operation of a software implementation of a guarantee-valuation engine is described in connection with a continuously offered mutual fund as one possible embodiment of the invention which moves money, as necessary, to mark the guarantee to market on a daily basis.

The GVE code 360 operates to guarantee the principal in the fund during a guarantee period which is a term prescribed in the prospectus and in supporting guarantee contract(s) (e.g., in the swap and put agreements). At block 505, a test is made to ensure that the guarantee is still applicable. This can be a test of the current date against a diary entry of the maturity date in a calendar to determine whether the maturity date on the guarantee has passed. Alternatively, the GVE code can cease operating with a given fund 14 after the maturity date due to a manual action by an administrator. Also, the guarantee may no longer be applicable because of some other trigger event such as the advisor or the fund failing to perform certain obligations under the guarantee agreement. If the guarantee is no longer applicable, the fund is conducted in a conventional manner, such as by not performing any of the actions in FIG. 4 that are shown in dashed lines, namely, blocks 430-440, 470, and 475).

Assuming, however, that the GVE code 360 is to continue calibrating the guarantee to the fund, the traditional assets of the fund have their ANAV quantified, as indicated at block 515. The traditional assets include those that are in furtherance of the investment strategy and not in furtherance of the guarantee. Thus, a fund operated in accordance with the invention that tracks the S&P 500 Index will have as its traditional assets stocks included in the S&P Index or derivatives (such as futures contracts, options on securities, indices or futures or swap agreements) based on the S&P 500 Index to correlate performance to the S&P 500, and will further have swap and put agreements that comprise the guarantee contract. Quantification of the NAV can be calculated by retrieving into a memory of the server or computer running the engine 360 a closing price for each of the investments in the fund, multiplying a quantity of each investment by the respective closing price, and summing the product of the multiplying operation. For a per share calculation, the result is divided by the number of its shares outstanding, whereas the ANAV is the NAV times the number of shares presently outstanding.

In calculating the NAV of the traditional assets, portfolio securities are valued using current market values or official closing prices, if available. The NAV is calculated at the close of regular trading of the New York Stock Exchange ("NYSE"), which is normally 4:00 p.m., Eastern Time. The NAV will not be calculated on days that the NYSE is closed for trading.

Each security owned by the fund 14 that is listed on a securities exchange is valued at its last sale price on that exchange on the date as of which assets are valued. Where the security is listed on more than one exchange, the fund will use the price of the exchange that the fund generally considers to be the principal exchange on which the stock is traded. Fund securities listed on the NASDAQ Stock Market, Inc. ("NASDAQ") will be valued at the NASDAQ official closing price, which may not necessarily represent the last sale price. If there has been no sale on such exchange or on NASDAQ on such day, the security is valued at the closing bid price on such day. When market quotations are not readily available, a security or other asset is valued at its fair value as determined under procedures approved by the a board of trustees established for the fund 14. These fair value procedures will also be used to price a security when corporate events, events in the securities market and/or world events cause the investment adviser to believe that a security's last sale price may not reflect its actual market value. The intended effect of using fair value pricing procedures is to ensure that the fund 14 is accurately priced. The board of trustees will regularly evaluate whether the fund's fair valuation pricing procedures continue to be appropriate in light of the specific circumstances of the fund and the quality of prices obtained.

When fair value pricing is employed, the prices of securities used by the fund 14 to calculate its NAV may differ from quoted or published prices for the same securities. Due to the subjective and variable nature of fair value pricing, it is possible that the fair value determined for a particular security may be materially different from the price of the security quoted or published by others or the value when trading resumes or realized upon its sale. Therefore, if a shareholder purchases or redeems shares in the fund when it holds securities priced at a fair value, this may have the unintended effect of increasing or decreasing the number of shares received in a purchase or the value of the proceeds received upon a redemption.

In the case of foreign securities, the occurrence of certain events after the close of foreign markets, but prior to the time the fund's NAV is calculated (such as a significant surge or decline in the U.S. or foreign markets) often will result in an adjustment to the trading prices of foreign securities when foreign markets open on the following business day. If such events occur, the fund will value foreign securities at fair value, taking into account such events, in calculating the NAV. In such cases, use of fair valuation can reduce an investor's ability to seek to profit by estimating the fund's NAV in advance of the time the NAV is calculated. The investment adviser anticipates that the fund's portfolio holdings will be fair valued only if market quotations for those holdings are considered unreliable.

The change in the ANAV over a prior day such as the immediately preceding date on which the public markets were open for trading is computed as indicated at block 520. For example, the change can be computed by taking the difference between the ANAV quantified at block 515 and the ANAV of the immediately preceding trading date. The ANAV on any given preceding date can be maintained in a memory of one of the application servers 340 or in a database associated therewith and retrieved for this computation. Regardless of whether the ANAV has increased or decreased on the current date, the GVE code 360 operates to calibrate the guarantee to cover the notional value of the fund, including any post-commencement subscriptions.

The published NAV/share price of the fund includes the value of the principal guarantee, and as such the non-traditional assets of the fund have to be valued for inclusion in the NAV. While the guarantee contract is an asset of the find, it is treated as a non-traditional asset (or assets, such as when multiple insurance, swap and option agreements are used) because their presence is to guarantee principal and not to advance the investment strategy. The ability value these instruments on a daily basis enables a minimum return guarantee on the fund to be priced daily, and hence enables the fund to operate under an open-ended, fully invested paradigm. The guarantee can be marked to market and the NAV can be priced to include the value of the traditional investments together with the guarantee.

The guarantee contract can comprise an insurance policy issued for the benefit of the shareholders of the fund 14 by a guarantor. The guarantor is paid a fee for that undertaking that obligation. By way of example, the fee can be 0.75% of the average daily net assets of the fund during the guarantee period, and using this pricing model the guarantor can accept further investments in an open-ended fund because changes in the magnitude of the guarantor's obligation are calibrated with additional premium (fees) for the added principal at risk (which in the form of an insurance policy is an increase in the surrender value). If on the maturity date of the guarantee the ANAV is less than the guaranteed amount, the find 14 liquidates and its shareholders receive a payment equal to the difference between the ANAV quantified for that date (as at block 515) and the guaranteed amount from the payment made by the guarantor to raise the value of the accounts to the guaranteed amount, pursuant to the financial guarantee policy insuring the guarantee. During the guarantee period, which runs from the inception date of the fund 14 through, say, the ten year anniversary of that date, the fund seeks capital growth through direct investments and/or derivatives while preserving principal and providing a minimum return. The guarantee of a minimum return is unconditional and irrevocable pursuant to a financial guarantee issued for the benefit of the shareholders of the fund 14 by a guarantor.

For example, an investor invests $10,000 in Class A shares of the fund 14 at the commencement of the guarantee period at a NAV of $10.00 per share. After deducting a an upfront sales load of 3.50%, $9,650 will be invested in Class A shares and the investor will have 965 shares in his or her account. Assume further that the NAV for Class A shares remains stable at $10.00 per share. The guaranteed amount is 150% of the NAV at the commencement of the guarantee period, less all fees and expenses of the fund 14 and any distributions paid. For the purpose of this example, assume that the net annual expenses of the fund for the guarantee period are 3.55%, and that no distributions have been paid. To calculate the guarantee owed to that investor, multiply the shares owned by 150% of the NAV, and subtract the fees and expenses of the fund:

| | |
|---|---|
| Shares Investor owns | 965 |
| 150% of NAV per share of Class A shares x | $15.00 |
| Total before Fees and Expenses | $14,475.00 |
| Less Fees and Expenses | −$3,425.75 |
| Investor's Guaranteed Amount | $11,049.25 |

The guaranteed amount will be reduced to the extent the fund incurs expenses that are not covered by any expense limitation agreement with the adviser that may be incorporated into the fund in the prospectus, and by any deferred sales charges.

Referring again to FIG. 5, the GVE is illustrated as calibrating a guarantee contract which comprises two components, each of which is valued based on changes in the market and each of which is adjusted so as to maintain a full guarantee of the principal in the fund, including any prescribed increase in the principal investment, on the maturity date. One component is a swap agreement and the other is a put agreement. A defined fee is payable to the guarantor (the counterparty to the swap and put agreements) for undertaking that obligation, and that can include periodic payments by the fund in exchange for the guarantee, as well as interim settlement payments back and forth during the guarantee term. The GVE code 360 operates to compute the interim settlement amounts and thereby calibrate the guarantee contract to the market at the close of each trading day. It is this portion of the guarantee payments that is depicted in FIG. 5. As a result, an investor can enjoy a guarantee of a minimum return over the initial NAV/share on the maturity date.

At block 525, a calculation model executes to compute any incremental adjustment to the price for maintaining the swap agreement. The swap agreement is intended to fully hedge the fund's obligations with respect to the payment of a guaranteed amount against a decline in the value of the S&P 500 Index below the guaranteed amount on the guarantee maturity date. During the course of the guarantee period, the swap agreement is re-priced through interim settlements between the swap holder and its counterparty guarantor. The particular calculation model used to compute the adjustment can be varied, but is one that is accepted in the industry, and more preferably is a calculation model for computing interim settlement amounts that is agreed to by and between the swap agreement counterparties, e.g., the fund 14 and a dealer. For example, either a Modified Black-Scholes or Binomial model can be used for the contingent leg which is the portion of the swap agreement that reflects the swap counterparty's obligation to the fund, and a standard equity forward discount model for the payment leg which is the portion of the swap agreement that reflects the fund's obligation to the swap counterparty.

In the event that there has been an uptick in the value of the swap, block 530 ("Yes: Uptick"), then a premium is collected from the swap counterparty (e.g., the dealer), as indicated at block 535. In the event that there has been a downtick in the value of the swap, block 530 ("No: Downtick"), then the fund pays the swap counterparty for the increased cost of the swap, as indicated at block 540. Settlement is made with the counterparty for that trading date (the current date), preferably on that same trading date, as indicated at block 545. Amounts received by the fund 14 pursuant to the daily settlements described above will be invested in cash equivalents and earn interest. To the extent permitted by applicable law, the fund 14 will borrow any funds necessary to effect its daily settlements obligations and incur a related interest expense.

The basic terms of a swap agreement that is suitable for use as a component that can be priced during the course of a guarantee obligation that protects the principal of a fully-invested open-ended fund include the following. The counterparties can be the fund 14 on the one hand and a dealer on the other. Preferably, the initial credit rating of the dealer is double-A or better by at least two major rating agencies. The notional amount of the swap is the product of the initial NAV per share on commencement date and the number of shares outstanding. The notional amount is adjusted each business day to account for changes in the number of shares outstanding. To support the swap, the dealer, for example, makes an initial payment to the fund of an amount equal to a minimum payment threshold. On a monthly basis, the fund pays the Dealer (or other counterparty) an amount that is accrued daily at an annual rate calculated on the notional amount, wherein the notional amount is indexed relative to changes in the benchmark. The rate can be set on the launch date of the fund to reflect actual market conditions. In one embodiment, the fund 14 can pay the counterparty a monthly fee at an annual rate of, say, 1.80% of the daily average of the product of the NAV per share prevailing on the launch date of the fund, the total return of the S&P 500 Index since launch (expressed as a price ratio), and the outstanding shares of the Fund, i.e., 1.8%*$12.50*(Current SPX+Divs)/Initial SPX. An initial index level can be set using the closing price of the benchmark on the launch date of the fund. A strike index level is set relative to the initial index level (e.g., at 150% of the initial index level), less cumulative dividends paid by the fund during the guarantee period. A final index level is then the closing price of the benchmark at the end of the guarantee period. A final dealer payment at the end of the guarantee period can be made by the swap counterparty (here, the dealer) to pay the fund an amount equal to any excess of the strike level over the final index level calculated on the notional amount. Likewise, a final fund payment is made by the fund 14 to the swap counterparty at the end of the guarantee period which is equal to the future value at Libor of the initial settlement payment, if any. An initial settlement payment can be appropriate when the swap has an initial non-zero value, such as when it is in the money as may be appropriate for establishing credit with the swap counterparty.

An "Interim Settlement Value" is calculable on any business day as being the difference between the fair value of the final dealer (counterparty) payment obligation as determined by the swap dealer and the present value at Libor of the Monthly Payments expressed per outstanding share. This value is reduced by the present value at Libor of the final fund payment divided by the number of outstanding shares. Each interim settlement at block 545, thus, has the dealer paying the fund 14 an amount equal to the positive change in Interim Settlement Value multiplied by outstanding shares (Yes: Uptick), or, if the change in Interim Settlement Values is negative, the absolute amount of such change is paid by the fund to the dealer (No: Downtick).

Meanwhile, at block 550, a calculation model executes to compute any incremental adjustment to the price for maintaining the put option agreement. The option agreement is intended to fully and additionally hedge the fund's obligations with respect to the payment of a guaranteed amount against a decline in the NAV of the fund below the guaranteed amount on the guarantee maturity date. During the course of the guarantee period, the option agreement is re-priced through interim settlements between the option holder and its counterparty guarantor. The particular calculation model used to compute the adjustment can be varied, but is one that is accepted in the industry, and more preferably is a calculation model for computing interim settlement amounts that is agreed to by and between the option agreement counterparties, e.g., the fluid 14 and a dealer. For example, either a Modified Black-Scholes or Binomial model can be used as this reflects the option counterparty's obligation to the fund.

In the event that there has been an uptick in the value of the put, block 555 ("Yes: Uptick"), then a premium may be collected from the option counterparty (e.g., the dealer), as indicated at block 560. More generally, if the fund 14 does not correlate with movement of its benchmark (e.g., the S&P 500 index), then the put will have value that can be settled on a daily basis. In the event that there has been a downtick in the value of the option, block 555 ("No: Downtick"), then the fund pays the option counterparty for the increased cost of the option, as indicated at block 565. An "Interim Settlement Value of the Put" is calculable on any business day as being the fair value of the put. Interim settlements are made daily, as indicated at block 570, with the counterparty. Amounts received by the fund 14 pursuant to the daily settlements described above will be invested in cash equivalents and earn interest. To the extent permitted by applicable law, the fund 14 will borrow any funds necessary to effect its daily settlements obligations and incur a related interest expense.

The basic terms of a put option agreement that is suitable for use as a component that can be priced during the course of a guarantee obligation that protects the principal of a fully-invested open-ended fund include the following. The counterparties can be the fund 14 on the one hand and a dealer on the other. Preferably, the initial credit rating of the dealer is double-A or better by at least two major rating agencies. The option agreement is preferably a European style put agreement calling for a cash settlement. The put is traded on the date that the fund 14 commences at a premium that reflects the guarantee against a decline in the NAV of the fund below the guaranteed amount on the guarantee maturity date. The expiration date is the maturity date on which the minimum redemption obligation is due. The underlying shares subject to the put agreement can comprises multiple classes of shares, and in that case there is a put that corresponds to each share class. The final price of the put for a given share class is the product of (i) the NAV for that class of shares on the expiration date and (ii) the number of outstanding shares in that class on the expiration date. The strike price of the put gives effect to the minimum guarantee return. Thus, if the minimum guarantee return is 150% of the initial investment, then the strike price is 150% of the product of (i) the NAV for the that class of shares on the inception date and (ii) the number of outstanding shares of that class, less (b) all fees of the fund 14 and fund expenses that have been paid or accrued since the inception date through the expiration date that are allocable to that class of shares, and less (c) the aggregate distributions per share for that class of shares from the inception date through the expiration date.

At block 575, shares in the fund are priced so as add the quantified NAV from block 515 of the traditional assets of the fund together with the price computed at blocks 525, 550 for the non-traditional guarantee components. The resulting sum is then published, as indicated at block 580 as the NAV of a share in the fund, and such pricing and publishing can be performed for each class of shares outstanding. Accordingly, the NAV of shares purchased or redeemed on any given date during the guarantee period will, if the swap and put agreements produce the results intended, include the then-current value of the guarantee on the guarantee maturity date.

Thus, in the foregoing discussion, the notional amount of the swap agreement and the option agreement will be based on the initial NAV of the fund and will be adjusted daily to reflect changes in the number of shares outstanding. In addition, the fair market value of the option agreement and the swap agreement (in other words, the difference between the fair value of the final payment obligation under the swap agreement and the present value of the fees payable by the fund to the counterparty will be adjusted and settled daily through payments received/made by the fund and the counterparty, as the case may be). As a result, the fund's daily NAV per share will reflect the current value of the guarantee. If on the guarantee maturity date the NAV of the fund is less than the guaranteed amount (despite the existence of the swap agreement and option agreement), the fund 14 will liquidate and shareholders will receive a payment equal to the difference between the NAV of the fund on that date and the guaranteed amount from the payment made by the guarantor pursuant to the guarantee contracts. The fund will seek growth of capital through investments that follow the benchmark with no further guarantee following the close of the guarantee period. The fund's NAV may fluctuate in the post-guarantee period.

For completeness it is noted that the order of the blocks in FIG. 4 and the flow diagram of FIG. 5 can be varied without impacting the operation of a fund implemented in accordance with the present description.

Figure 6:
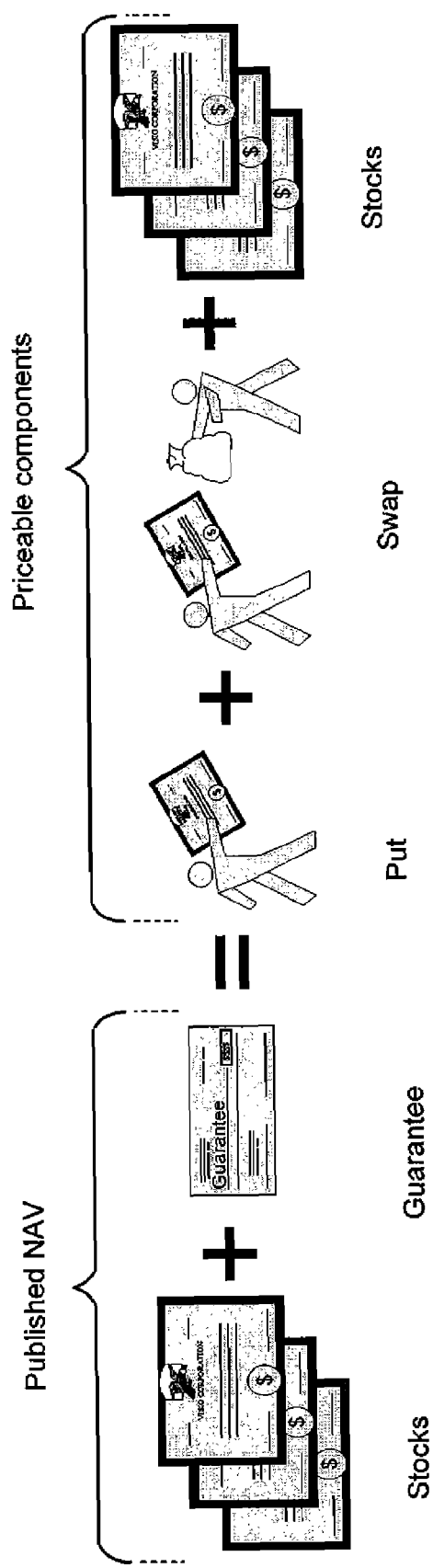
FIG. 6 is a conceptual diagram illustrating the individual components of a fund constructed and operated in accordance with the invention that permit a daily reevaluation of the cost of a guarantee for the fund.

Referring now to FIG. 6, the individual components that comprise a fund constructed and operated in accordance with the invention are illustrated to further an understanding of a broad aspect of the present invention. As described above, a fund 14 in accordance with the invention includes traditional assets and non-traditional assets, shown as stocks and a minimum return guarantee. Daily re-evaluation of the price of the guarantee throughout the guarantee period is achieved by defining the guarantee in terms of priceable components, shown in FIG. 6 as put and swap agreements.

Figure 7:
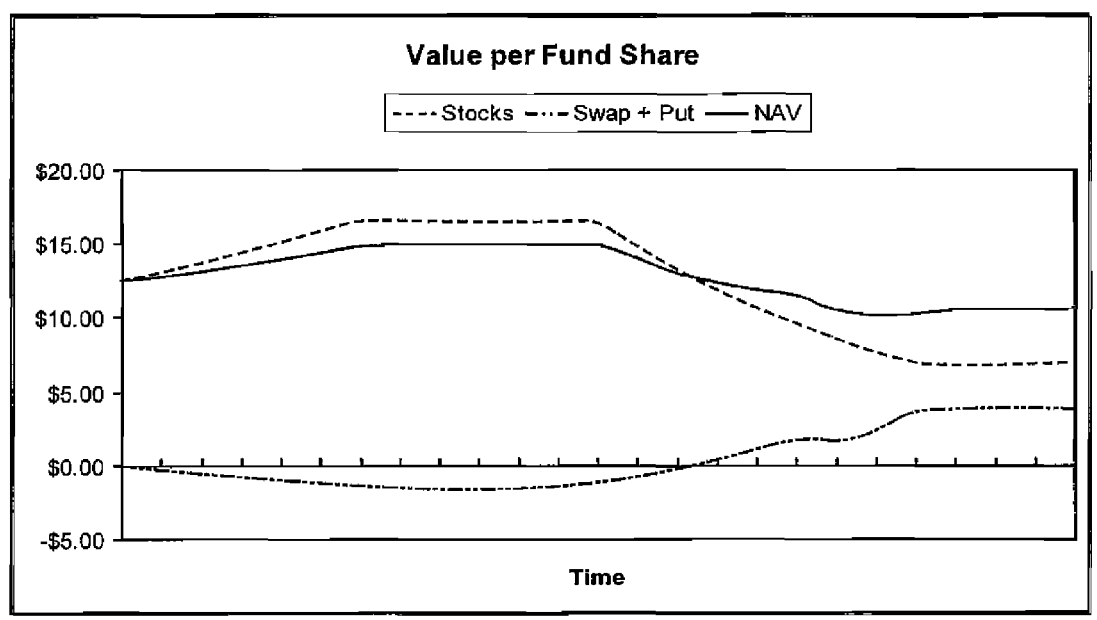
FIG. 7 is a graph illustrating the relationship of the components that comprise a fund constructed and operated in accordance with the invention.

FIG. 7 provides a graph that illustrates the NAV of the fund 14 over time, including market periods in which the traditional assets undergo an increase in value, then an unchanged period, followed by a steep decline and then another unchanged period. The guarantee contracts operate to hedge those changes throughout the course of the guarantee period so that an investor not only can realize a return of a guaranteed return on the initial NAV/share at the end of the maturity period, but in some cases, can have an investment that exceeds the aggregate value of the traditional assets due to value support provided by the guarantee contract(s), such as during the time that the stocks decline in value to a point below the initial NAV, which in FIG. 7 is $12.50/share.

While the present invention has been described in terms of specific embodiments, it is to be understood that the invention is not limited to these disclosed embodiments. This invention may be embodied in many different forms and should not be construed as limited to the embodiments set forth herein; rather, these embodiments are provided by way of illustration only and so that this disclosure will be thorough, complete and will fully convey the full scope of the invention to those skilled in the art. Indeed, many modifications and other embodiments of the invention will come to mind of those skilled in the art to which this invent ion pertains, and which are intended to be and are covered by both this disclosure, the drawings and the claims.

I claim:

1. A system operative to guarantee on a daily basis a minimum return by an open-ended mutual fund on a maturity date, the fund having traditional assets that correlate to a benchmark invested in a market, comprising:

a valuation engine comprising a processor configured by code to:

quantify an aggregate net asset value (ANAV) of the traditional assets of the fund as of a current date;

calibrate a notional amount of a swap agreement relative to any change in the benchmark on the current date, wherein the swap agreement comprises a hedge against any decline in the benchmark and is separate from and in addition to said traditional assets of the fund;

calibrate a notional amount of an option agreement in regard to the ANAV on the current date, wherein the option agreement comprises a hedge against any decline in the value of the fund below the minimum return on the maturity date and is separate from and in addition to said traditional assets of the fund;

price a share of the fund at the close of the current date by adding the calibrations to the ANAV while the traditional assets remain fully and permanently invested in the market and dividing the total by a number of outstanding shares on the current date; and publish the price of the share for use on the current date.

2. The valuation engine as in claim 1, wherein the code is further configured to calculate a change in the ANAV of the traditional assets of the fund for the current date over a prior date, and wherein the option agreement is calibrated relative to said calculated change in the ANAV.

3. The valuation engine as in claim 2, wherein the calibration is in response to the any calculated change in the ANAV of the traditional assets of the fund.

4. The valuation engine as in claim 1, wherein the swap agreement comprises a full hedge on the maturity date.

5. The valuation engine as in claim 1, wherein the fund includes plural classes of shares, the option agreement comprises an option agreement for each class of shares, and the option agreement is calibrated in regard to the ANAV on the current date for each class of shares.

6. The valuation engine as in claim 5, wherein the code is further configured to calculate a change in the ANAV of the traditional assets of the fund for each class of shares on the current date over a prior date, and wherein the option agreement is calibrated relative to said calculated change in the ANAV.

7. The valuation engine as in claim 6, wherein the calibration steps are in response to the step of calculating the change.

8. The valuation engine as in claim 1, wherein the code is configured to quantify the ANAV as of the current date by:

retrieving into a memory a closing price for each of the investments in the fund;

multiplying a quantity of each investment by the respective closing price; and summing the product of the multiplying operation.

9. The valuation engine as in claim 1, wherein the code is farther configured to process a subscription request of an investor by:

identifying an investor account associated with the subscription request which has cash for investment in the fund;

associating an integer number of shares with the investor account, the integer number being no greater than the cash divided by the price; and initiating a transfer request to transfer the cash from the investor account to:

the fund to pay for the integer number of shares;

a swap agreement counterparty to pay for the swap agreement calibration; and an option agreement counterparty to pay for the option agreement calibration.

10. The valuation engine as in claim 9, wherein at least one of the swap agreement counterparty and the option agreement counterparty is the find itself.

11. The valuation engine as in claim 1, wherein the code is further configured to process a redemption request of an investor by:

identifying an investor account associated with the redemption request;

disassociating an integer number of shares from the investor account;

initiating a transfer request to transfer cash into the investor account in an amount equal to the product of the integer number of shares and the price, less any management fee; and record receipt of a premium from a swap agreement counterparty for the swap agreement calibration; and record receipt of a premium from an option agreement counterparty for the option agreement calibration.

12. The valuation engine as in claim 11, wherein at least one of the swap agreement counterparty and the option agreement counterparty is the find itself.

13. The valuation engine as in claim 1, wherein the code is configured to calibrate the swap agreement by:

retrieving into a memory a current-date price of the benchmark and a prior-date price of the benchmark;

computing an adjustment to a price of the swap agreement in view of at least a portion of the price data retrieved into the memory, the current date, the maturity date, the guaranteed minimum return, and the ANAV; and transferring funds based on the computed price adjustment, wherein the transferring comprises:

collecting a premium from the swap agreement underwriter in the event of an uptick in the price of the swap agreement; and paying the swap agreement underwriter in the event of a downtick in the price of the swap agreement.

14. The valuation engine as in claim 1, wherein the code is configured to calibrate the option agreement by:

computing an adjustment to a price of the option agreement in view of the current date, the maturity date, and the ANAV; and transferring funds based on the computed price adjustment, wherein the transferring comprises:

collecting a premium from the option agreement underwriter in the event of an uptick in the price of the option agreement; and paying the option agreement underwriter in the event of a downtick in the price of the option agreement.

* * * * *